United States Patent [19]

Miki et al.

[11] Patent Number: 5,055,200
[45] Date of Patent: Oct. 8, 1991

[54] METHOD OF TREATING LOW-CONCENTRATION TURBID WATER

[75] Inventors: Toshiyuki Miki, Kanagawa; Show Tono; Kazunori Kozu, both of Tokyo; Shintaro Hayashi, Saitama, all of Japan

[73] Assignee: Aoki Corporation, Osaka, Japan

[21] Appl. No.: 490,702

[22] Filed: Mar. 7, 1990

[30] Foreign Application Priority Data

Jul. 3, 1989 [JP]  Japan .................................. 1-172711

[51] Int. Cl.⁵ ............................................... C02F 1/52
[52] U.S. Cl. .................... 210/726; 210/727; 210/733; 210/734; 210/735; 210/728
[58] Field of Search ............... 210/726, 727, 728, 732, 210/733, 734, 735

[56] References Cited

U.S. PATENT DOCUMENTS

| 3,259,570 | 7/1966 | Priesing et al. | 210/727 |
| 3,377,274 | 4/1968 | Burke et al. | 210/727 |
| 3,408,293 | 10/1968 | Dajani | 210/727 |
| 3,617,568 | 11/1971 | Ries, Jr. | 210/727 |
| 3,723,310 | 3/1973 | Lang | 210/727 |
| 4,569,768 | 2/1986 | McKinley | 210/727 |

FOREIGN PATENT DOCUMENTS 0055489  7/1982  European Pat. Off. ............ 210/727

*Primary Examiner*—Stanley S. Silverman
*Assistant Examiner*—Neil M. McCarthy
*Attorney, Agent, or Firm*—Wenderoth, Lind & Ponack

[57] ABSTRACT

The present invention provides a method of treating low-concentration turbid water, which comprises adding an anionic coagulant and a cationic coagulant in this order and forcedly stirring the mixture. According to the present invention, low-concentration turbid water of even up to 100 ppm can be cleaned to below 10 ppm at a high efficiency in a single treatment.

1 Claim, No Drawings

METHOD OF TREATING LOW-CONCENTRATION TURBID WATER

FIELD OF THE INVENTION

The present invention relates to a method of treating low-concentration turbid water, and more particularly, to a new treating method which allows formation of lock form low-concentration turbid water and removal thereof through settlement, which has so far been impossible to treat.

PRIOR ART

Along with the increasing public interest in pollution control, improvements have been made in the treatment technology of turbid water of rivers and lakes and are achieving remarkable results.

In the treatment of turbid water, it is a usual practice to first add a coagulant such as cationic inorganic substance, and then add an anionic coagulant, thereby causing settlement and separation of the turbidity components.

In spite of such progress made in the treatment of turbid water, however, there still remains a problem which cannot be solved in the treatment of rivers, lakes and construction sites, that is, it is not possible to clean low-concentration turbid water.

In the conventional treatment of turbid water, it is possible to treat turbid water having a concentration of at least 30,000 ppm to reduce the concentration to a turbidity of about 3,500 to 2,000 ppm relatively easily. It is, however, practically impossible to clean low-concentration turbid water of up to 1,000 ppm down to below 10 ppm.

In order to clean such turbid water to a concentration of about 10 ppm, it is necessary to restore the once settled turbidity components (SS) to the raw water level in a multi-stage settling process, increase the concentration of turbidity components of water for further settling treatment, and treat the resultant water through a filtering tank or the like. Such procedures are complicated and troublesome process and require much money and labor. It is therefore actually impossible to use this process on a practical level.

OBJECT OF THE INVENTION

The present invention has been developed with a view towards overcoming the defects involved in the conventional method of treating turbid water, and to provide a new method of treatment which permits cleaning turbid water having a low concentration of up to 1,000 ppm, or even up to 100 pm at a high efficiency through a single run of treatment to a concentration below 10 ppm.

DETAILED DESCRIPTION OF THE INVENTION

The present invention provides a method of treating turbid water, characterized by comprising the steps of sequentially adding an anionic coagulant and then a cationic coatulant to low-concentration turbid water, forcedly stirring the resultant mixture, and causing flock produced from such treatment to be removed through settlement.

Furthermore, one of the preferred embodiments of the present invention is to continue further the sequential addition of coagulants.

The method of the present invention will now be described in more detail. The low-concentration turbid water described in the present invention has a concentration of up to 1,000 ppm. The cleaning of such low-concentration turbid water to a concentration below 10 ppm is very difficult by conventional methods. In treating such low-concentration turbid water by the method of the present invention, it is essential to add an anionic coagulant and then a cationic coagulant in this order and to sufficiently stir the mixture.

Suitable anionic coagulants include a poly acrylamido polymer coagulants and other polymer coagulants. Such polymer coagulants include, for example, acrylamido-acrylic acid copolymers and partially sulfomethylated polyacrylamido, and polyacrylamido-propane sulfates.

Similarly, a polymer coagulant may suitably be used as the cationic coagulant. Examples include polyaminoalkylmethacrylates, and polyethyleneimines. Almost no desired effects are achieved with PAC (polyaluminum chloride) or inorganic cationic coagulants such as iron chloride or iron sulfate.

The consumption of the coagulant may be selected appropriately from a wide range, depending upon the concentration of the turbid water to be cleaned. The consumption does not form an important factor in the method of the present invention.

The addition of the anionic and the cationic coagulants should be made sequentially, and as required, this sequential addition may be carried out on a continuous basis.

Sufficient dispersion should be ensured through addition of these coagulants and it is necessary here to adopt forced high-speed stirring. This may be accomplished by stirring at a speed of about 400 rpm for about 5 to 30 seconds. Such stirring procedure enhances the contact between the settling components in the turbid water and the coagulant particles.

In the present invention, a low-concentration turbid water of a concentration of even up to 100 ppm can be cleaned to below 10 ppm at a high efficiency in a single treatment by adding the anionic coagulant and the cationic coagulant in this order and forcedly stirring the mixture. This accomplishment has been absolutely impossible by the conventional method, which method is mainly based on treatment with a cationic coagulant.

EXAMPLE

The method of the present invention was carried out by use of a jar tester. A 500-cc beaker was used and the mixture was stirred at a speed of 400 rpm for five to ten seconds.

The raw water used had a concentration as shown in Table 1: Examples 1 to 3 related to turbid water from construction sites, and Examples 4 to 6 related to turbid water obtained from muddy rivers.

The resultant concentrations are under 10 ppm in all cases.

For comparison purposes, treatment using a low-speed (200 rpm) stirring are also shown in Table 1. According to such low speed stirring, on limited effects are achieved in reducing the concentration. Table 2 shows examples using PAC in which almost no concentration reducing effects are achieved.

TABLE 1

| Example | Raw Water Concentration | High-Speed Forced Stirring (400 rpm) | | Low-Speed Stirring (200 rpm) | |
|---|---|---|---|---|---|
| | | Treating Time (Seconds) | Supernatant Water Concentration (ppm) | Treating Time (Seconds) | Supernatant Water Concentration (ppm) |
| 1 | 120 | 10 | 4 | 90 | 120 |
| 2 | 180 | 10 | 7 | 90 | 170 |
| 3 | 200 | 5 | 8 | 60 | 190 |
| 4 | 55 | 10 | 8 | 90 | 55 |
| 5 | 210 | 10 | 5 | 60 | 200 |
| 6 | 80 | 10 | 8 | 60 | 80 |

TABLE 2

| Example for comparison | Raw Water Concentration | High-Speed Forced Stirring (400 rpm) | | Low-Speed Stirring (200 rpm) | |
|---|---|---|---|---|---|
| | | Treating Time (Seconds) | Supernatant Water Concentration (ppm) | Treating Time (Seconds) | Supernatant Water Concentration (ppm) |
| 1 | 120 | 60 | 110 | 90 | 120 |
| 2 | 200 | 60 | 170 | 60 | 190 |

(Note) PAC + polymer coagulant

EFFECTS OF THE INVENTION

Accroding to the method of the present invention, as describe above in detail, it is possible to clean low-concentration turbid water having a concentration of lock-forming SS components of up to 1,000 ppm, or even up to 100 ppm to a drinking water level of under 10 ppm through a single treatment. This allows treatment at a high efficiency and represents a remarkable advance in pollution control.

What is claimed is:

1. A method of treating low-concentration turbid water having a concentration of suspended solids in the range of from about 50 to 200 ppm to reduce the concentration of the suspended solids to below 10 ppm, which comprises sequentially adding first an anionic polymer coagulant and then a cationic polymer coagulant to the water, forcibly stirring the thus treated water at a stirring speed of about 400 rpm for about 5-30 seconds, and removing flock formed as a result of treating the turbid water with said coagulants.

* * * * *